(12) United States Patent
Zakhor et al.

(10) Patent No.: US 10,127,718 B2
(45) Date of Patent: Nov. 13, 2018

(54) METHODS FOR INDOOR 3D SURFACE RECONSTRUCTION AND 2D FLOOR PLAN RECOVERY UTILIZING SEGMENTATION OF BUILDING AND OBJECT ELEMENTS

(71) Applicant: INDOOR REALITY, Berkeley, CA (US)

(72) Inventors: Avideh Zakhor, Berkeley, CA (US); Eric Lee Turner, Berkeley, CA (US)

(73) Assignee: INDOOR REALITY INC., Berkeley, CA (US)

( * ) Notice: Subject to any disclaimer, the term of this patent is extended or adjusted under 35 U.S.C. 154(b) by 384 days.

(21) Appl. No.: 14/947,869

(22) Filed: Nov. 20, 2015

(65) Prior Publication Data

US 2017/0148211 A1     May 25, 2017

(51) Int. Cl.
*G06T 17/05* (2011.01)
*H04N 5/341* (2011.01)
(Continued)

(52) U.S. Cl.
CPC .............. *G06T 17/05* (2013.01); *G06K 9/209* (2013.01); *G06K 9/4604* (2013.01); *G06T 3/0062* (2013.01); *G06T 3/4038* (2013.01); *G06T 15/005* (2013.01); *G06T 15/04* (2013.01); *G06T 15/205* (2013.01); *G06T 17/00* (2013.01); *G06T 19/006* (2013.01); *H04N 5/23238* (2013.01); *H04N 5/3415* (2013.01); *H04N 13/279* (2018.05)

(58) Field of Classification Search
CPC ......... G06T 9/001; G06T 15/08; G06T 17/00; G06T 17/20; G06T 19/00
USPC ....................................................... 345/419
See application file for complete search history.

(56) References Cited

U.S. PATENT DOCUMENTS 6,396,492 B1 * 5/2002 Frisken .................... G06T 17/00
345/420
6,990,228 B1 * 1/2006 Wiles ....................... G06T 17/10
345/419
(Continued)

OTHER PUBLICATIONS

Turner, E., & Zakhor, A. (Oct. 2012). Watertight as-built architectural floor plans generated from laser range data. In 3D Imaging, Modeling, Processing, Visualization and Transmission (3DIMPVT), 2012.*

Klaas, Ottmar, and Mark S. Shephard. "Automatic generation of octree-based three-dimensional discretizations for partition of unity methods." Computational Mechanics 25.2-3 (2000): 296-304 (Year: 2000).*

(Continued)

*Primary Examiner* — Sae Won Yoon
(74) *Attorney, Agent, or Firm* — Kali Law Group, P.C.

(57) ABSTRACT

Methods for indoor 3D surface reconstruction and 2D floor plan recovery by segmenting a number of objects and building structure elements from a building scan using an electronic computing device are presented, the methods including: causing the electronic computing device to capture the building scan, where the building scan includes a number of scan points; pre-processing scan data from the building scan; generating an octree and a 2.5D model from the pre-processed scan data; extracting interior and exterior volumes from the octree model and the 2.5D model; and meshing the extracted volumes to generate a 3D object geometry and a 3D building geometry, where the 3D object geometry corresponds with the number of objects and the 3D building geometry corresponds with the indoor 3D surface reconstruction of building structure elements.

16 Claims, 7 Drawing Sheets

(51) Int. Cl.

| | | |
|---|---|---|
| *G06T 3/40* | (2006.01) | |
| *G06T 17/00* | (2006.01) | |
| *G06T 15/20* | (2011.01) | |
| *G06T 15/04* | (2011.01) | |
| *G06T 19/00* | (2011.01) | |
| *H04N 13/279* | (2018.01) | |
| *G06T 3/00* | (2006.01) | |
| *G06T 15/00* | (2011.01) | |
| *G06K 9/20* | (2006.01) | |
| *G06K 9/46* | (2006.01) | |
| *H04N 5/232* | (2006.01) | |

(56) References Cited

U.S. PATENT DOCUMENTS

| | | | | |
|---|---|---|---|---|
| 2008/0117205 | A1* | 5/2008 | Storti | G06T 17/00 345/420 |
| 2008/0238919 | A1* | 10/2008 | Pack | G06T 15/04 345/420 |
| 2009/0244065 | A1* | 10/2009 | Storti | G06K 9/342 345/420 |
| 2013/0259341 | A1* | 10/2013 | Mountney | A61B 5/0035 382/131 |
| 2014/0125667 | A1* | 5/2014 | Praun | G06T 17/05 345/423 |
| 2015/0187130 | A1* | 7/2015 | Guskov | G06T 17/20 345/420 |

OTHER PUBLICATIONS

Jalba, Andrei C., and Jos BTM Roerdink. "Efficient surface reconstruction using generalized coulomb potentials." IEEE Transactions on Visualization and Computer Graphics 13.6 (2007): 1512-1519 (Year: 2007).*

Mazura, Andreas, and S. Seifert. "Virtual cutting in medical data." Studies in health technology and informatics (1997): 420-429 (Year: 1997).*

Eric Turner, 3D Modeling of Interior Building Environments and Objects from Noisy Sensor Suites, Electrical Engineering and Computer Sciences University of California at Berkeley, May 14, 2015, p. 148.

Eric Turner, Avideh Zakhor, Floor Plan Generation and Room Labeling of Indoor Environments fromLaser Range Data, Department of Electrical Engineering and Computer Sciences, University of California, Berkeley, CA, United States, p. 12.

George Chen, John Kua, Stephen Shum, Nikhil Naikal, Matthew Carlberg, Avideh Zakhor, Indoor Localization Algorithms for a Human-Operated Backpack System, Video and Image Processing Lab, University of California, Berkeley, p. 8.

Timothy Liu, Matthew Carlberg, George Chen, Jacky Chen, John Kua, Avideh Zakhor, Indoor Localization and Visualization Using a Human-Operated Backpack System, 2010 International Conference on Indoor Positioning and Indoor Navigation (IPIN), Sep. 15-17, Zurich, Switzerland, p. 10.

* cited by examiner

METHODS FOR INDOOR 3D SURFACE RECONSTRUCTION AND 2D FLOOR PLAN RECOVERY UTILIZING SEGMENTATION OF BUILDING AND OBJECT ELEMENTS

CROSS-REFERENCE TO RELATED APPLICATIONS

The present invention is related to the following applications, all of which are incorporated herein by reference:

Commonly assigned application entitled 3D SPHERICAL IMAGE SYSTEM, U.S. patent application Ser. No. 14/855,742, filed on Sep. 16, 2015, by the same inventors herein.

BACKGROUND

Augmented and virtual reality, indoor navigation, and building simulation software is rapidly changing. The ability to automatically and rapidly generate a 3D mesh of building surfaces from static or mobile scanning systems is important to many fields, such as augmented and virtual reality, gaming, simulation, architecture, engineering, construction, and emergency response services. Existing 3D meshing algorithms applied to the 3D point cloud of building interiors typically mesh the objects inside the buildings and the building structure elements such as floors, walls, and ceilings together in one mesh. Unfortunately, such a single mesh does not faithfully represent the building structure elements due to clutter introduced by objects such as furniture or fixtures and, as such, may result in inaccurate 3D architectural model of the building, or 2.5D or 2D floor plans of the building. In addition, conventional single mesh algorithms introduce storage and transmission inefficiencies because all elements are represented with the same level of detail resulting in a large number of triangles, even though floors and walls can, in fact, be represented with much fewer triangles since they are usually planar.

As such, methods for indoor 3D surface reconstruction and 2D floor plan recovery utilizing segmentation of building and object elements are presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for indoor 3D surface reconstruction and 2D floor plan recovery by segmenting a number of objects and building structure elements from a building scan using an electronic computing device are presented, the methods including: causing the electronic computing device to capture the building scan, where the building scan includes a number of scan points; pre-processing scan data from the building scan; generating an octree and a 2.5D model from the pre-processed scan data; extracting interior and exterior volumes from the octree model and the 2.5D model; and meshing the extracted volumes to generate a 3D object geometry and a 3D building geometry, where the 3D object geometry corresponds with the number of objects and the 3D building geometry corresponds with the indoor 3D surface reconstruction of building structure elements. In some embodiments, the pre-processing the scan data further includes: estimating a 3D position and a corresponding uncertainty of the 3D position from a system trajectory for each of the number of scan points in the scan data; estimating for each scan point, a likelihood that a nearby volume to each of the number of scan points is an interior location or an exterior location. In some embodiments, the estimated 3D position for each of the number of scan points is represented as two 3D Gaussian distributions. In some embodiments, the estimating the 3D position for each of the scan points further includes accounting for an uncertainty such as: localization estimate, timestamp synchronization, and intrinsic sensor noise. In some embodiments, generating the octree further includes: merging all of the scan points using a carve mapping function; determining a number of interior leaf nodes, a number of exterior leaf nodes and a number of boundary faces between the interior leaf nodes and the exterior leaf nodes; and storing the external leaf nodes, the internal leaf nodes, and the boundary faces in the octree. In some embodiments, the octree is generated at a resolution in a range of approximately 5 to 10 cm. In some embodiments, generating the 2.5D model further includes: generating a number of wall samples from the octree; feeding the number of wall samples into a 2D floor plan of the building structure elements to create a watertight 2D model; and extruding a 2.5D model from the 2D model. In some embodiments, extracting interior and exterior volumes further includes: for each of the scan points, if the scan point is exterior in the octree and interior in the 2.5D model, classifying the scan point as one of the objects; if the scan point is exterior in the octree and exterior in the 2.5D model, classifying the scan point as the building structure element; and if the scan point is interior in the octree and interior in the 2.5D model, classifying the scan point as an interior open space. In some embodiments, if the scan point is classified as one of the objects, generating a higher resolution leaf node corresponding with the scan point. In some embodiments, meshing the extracted volumes to generate the 3D building geometry further includes: partitioning each of the number of boundary faces in the octree into a planar region; determining any intersection points between neighboring planar regions; and inserting vertices for the building geometry. In some embodiments, meshing the extracted volumes to generate the 3D object geometry further includes: mapping each of the boundary faces to a vertex into a face of the 3D object geometry; mapping each corner of the octree into the face of the object geometry; calculating an offset to position the object geometry; and generating a watertight surface for the 3D object geometry. In some embodiments, methods further include: generating a top-down 2D histogram of values corresponding with the number of internal leaf nodes in the octree.

In other embodiments, computing device program products for indoor 3D surface reconstruction and 2D floor plan recovery by segmenting a number of objects and building structure elements from a building scan using an electronic computing device are presented, the computing device program product including: a non-transitory computer readable medium; first programmatic instructions for causing the electronic computing device to capture the building scan, where the building scan includes a number of scan points; second programmatic instructions for pre-processing scan data from the building scan; third programmatic instructions for generating an octree and a 2.5D model from the preprocessed scan data; fourth programmatic instructions for extracting interior and exterior volumes from the octree model and the 2.5D model; and fifth programmatic instructions for meshing the extracted volumes to generate a 3D object geometry and a 3D building geometry, where the 3D object geometry corresponds with the number of objects and the 3D building geometry corresponds with the indoor 3D surface reconstruction of the building structure elements, where the programmatic instructions are stored on the non-transitory computer readable medium. In some embodiments, the second programmatic instructions for pre-processing the scan data further includes: sixth programmatic instructions for estimating a 3D position and a corresponding uncertainty of the 3D position from a system trajectory for each of the scan points in the scan data; seventh programmatic instructions for estimating for each scan point, a likelihood that a nearby volume to each of the scan points is an interior location or an exterior location. In some embodiments, the third programmatic instructions for generating the octree further includes: eight programmatic instructions for merging all of the scan points using a carve mapping function; ninth programmatic instructions for determining a number of interior leaf nodes, a number of exterior leaf nodes and a number of boundary faces between the interior leaf nodes and the exterior leaf nodes; and tenth programmatic instructions for storing the external leaf nodes, the internal leaf nodes, and the boundary faces in the octree. In some embodiments, third programmatic instructions for generating the 2.5D model further includes: eleventh programmatic instructions for generating a number of wall samples from the octree; twelfth programmatic instructions for feeding the wall samples into a 2D floor plan of the building structure elements to create a watertight 2D model; and thirteenth programmatic instructions for extruding a 2.5D model from the 2D model. In some embodiments, fifth programmatic instructions for meshing the extracted volumes to generate the 3D building geometry further includes: fourteenth programmatic instructions for partitioning each of the boundary faces in the octree into a planar region; fifteenth programmatic instructions for determining any intersection points between neighboring planar regions; and sixteenth programmatic instructions for inserting vertices for the building geometry. In some embodiments, fifth programmatic instructions for meshing the extracted volumes to generate the 3D object geometry further includes: seventeenth programmatic instructions for mapping each of the boundary faces to a vertex into a face of the 3D object geometry; eighteenth programmatic instructions for mapping each corner of the octree into the face of the 3D object geometry; nineteenth programmatic instructions for calculating an offset to position the 3D object geometry; and twentieth programmatic instructions for generating a watertight surface for the 3D object geometry.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
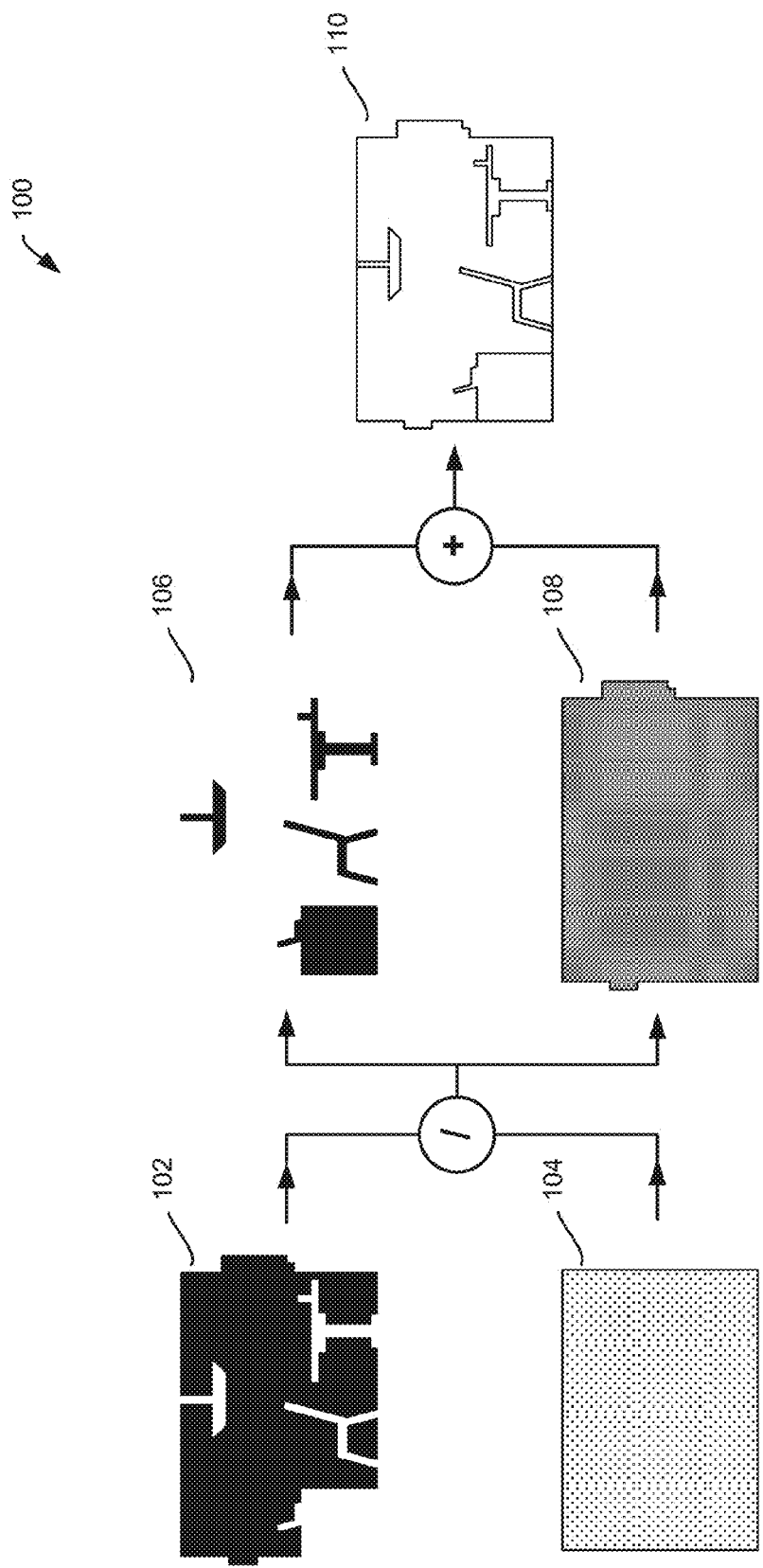
FIG. 1 is an illustrative pictorial representation of an overview of methods for automated segmentation of building and objects in accordance with embodiments of the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

As noted above, existing 3D meshing algorithms for building interiors typically mesh the objects inside the buildings, and the building structure elements such as floors, walls, and ceilings, together in one mesh. In many applications it is desirable to have a separate mesh for the objects than the structural elements. For example to recover the architectural floor plan of the building, objects such as furniture need to be discarded to minimize the error in the recovered floor plan. Also, to achieve storage and transmission efficiency, it may be desirable to segment buildings and objects so that the planar structural elements such as floors, walls, and ceilings are represented with fewer triangles, while objects with fine details are represented with more triangles.

FIG. 1 is an illustrative pictorial representation 100 of an overview of methods for indoor 3D surface reconstruction and 2D floor plan recovery by segmentation of building and objects in accordance with embodiments of the present invention. Utilizing methods disclosed herein a scanned volume may be meshed using two approaches that may be combined to separate 3D building geometry and 3D object geometry. As illustrated, octree 102 represents complex geometry while 2.5 dimensional (D) model 104 represents simple geometry. Each of these geometries may be combined to extract 3D object geometry 106 and 3D building geometry 108. The volumes may then be meshed to form a modeled environment 110. FIG. 1 will be further referenced with respect to FIGS. 2-6.

Figure 2:
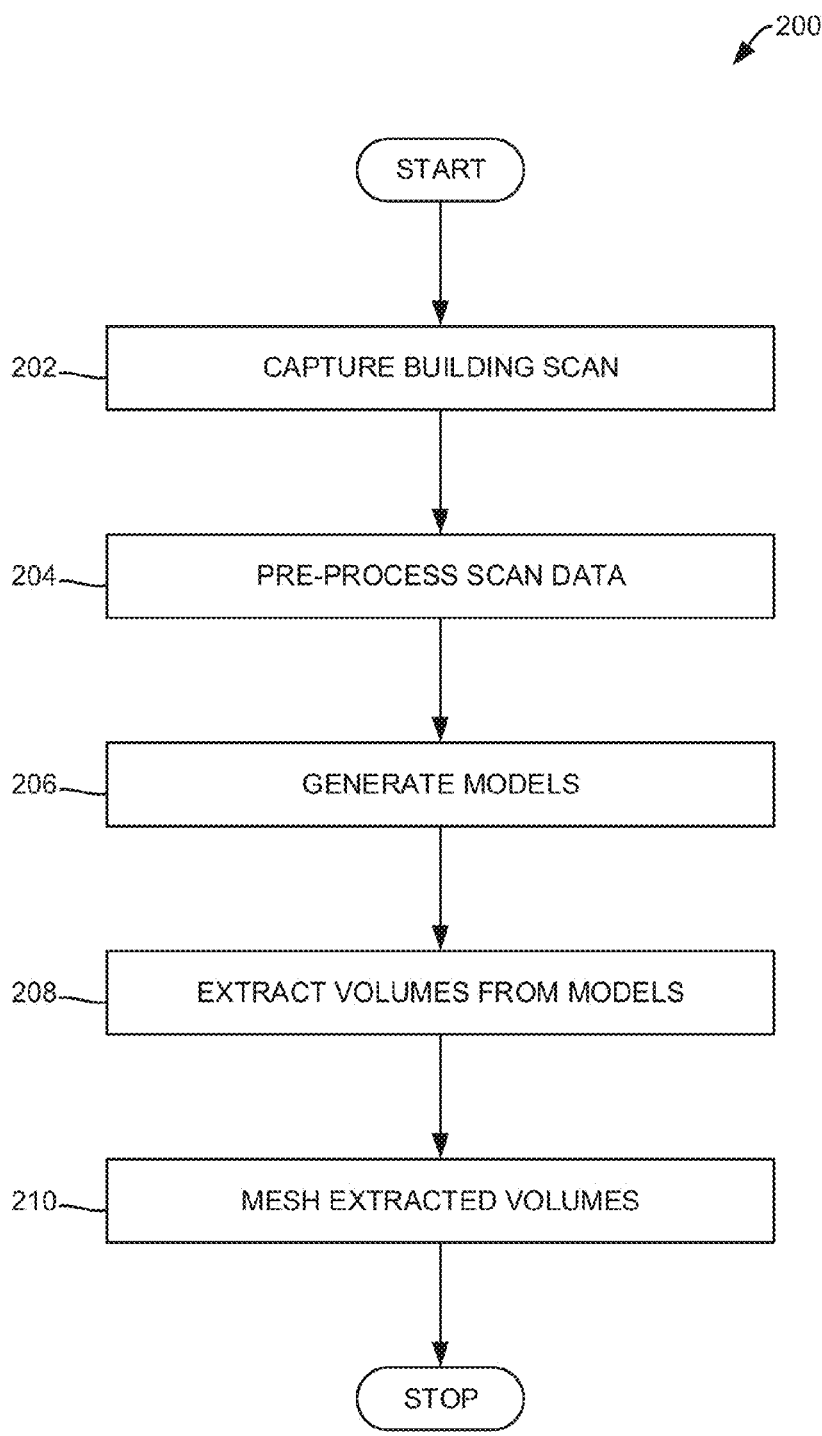
FIG. 2 is an illustrative flowchart of methods for indoor 3D surface reconstruction and 2D floor plan recovery by segmentation of building and objects in accordance with embodiments of the present invention.

FIG. 2 is an illustrative flowchart 200 of methods for indoor 3D surface reconstruction and 2D floor plan recovery by segmentation of building and objects in accordance with embodiments of the present invention. In particular, flowchart 200 represents an overview of methods disclosed herein. As such, at a first step 202, the method captures a building scan. A building scan may be captured by known methods such as those found in U.S. patent application Ser. No. 14/855,742, filed on Sep. 16, 2015, which is hereby incorporated by reference in its entirety. Conventionally, building scans are limited to scanning the indoor environment, but cannot distinguish between the building and objects within the building. A building scan provides data for methods disclosed herein. For example, a building scan may provide a system trajectory, or equivalently a system path which stores how the scanner moved through the building environment. System trajectory may be represented as a sequence of positions and orientations over time. As such, a building scan captured by an electronic computing device may include any number of scan points. At a next step, 204, the method pre-processes scan data from the building scan. In short, an objective of pre-processing is to convert an input set of scan points into a labeling of space where each location is assigned a likelihood of being interior or exterior. Pre-processing steps will be disclosed in further detail below for FIG. 3.

At a next step 206, the method generates models. In embodiments, methods generate an octree and a 2.5D model as shown, for example in FIGS. 1, 102 and 104 respectively. An octree represents a complex model of the volume scanned and a 2.5D model represent a simplified model of the same volume. Generating models steps will be disclosed in further detail below for FIG. 4. At a next step, 208, the method extracts volumes from models as shown, for example in FIG. 1, 106 and 108. In short, the building and the objects in the building may be extracted at a step 208. Extracting volumes will be disclosed in further detail below for FIG. 5. At a next step, 210, the method meshes extracted volumes to provide a model of large indoor scanned environments while preserving the fine detail of objects in those environments as shown, for example, in FIG. 1, 110. Meshing extracted volumes will be disclosed in further detail below for FIG. 6. The method then ends.

Figure 3:
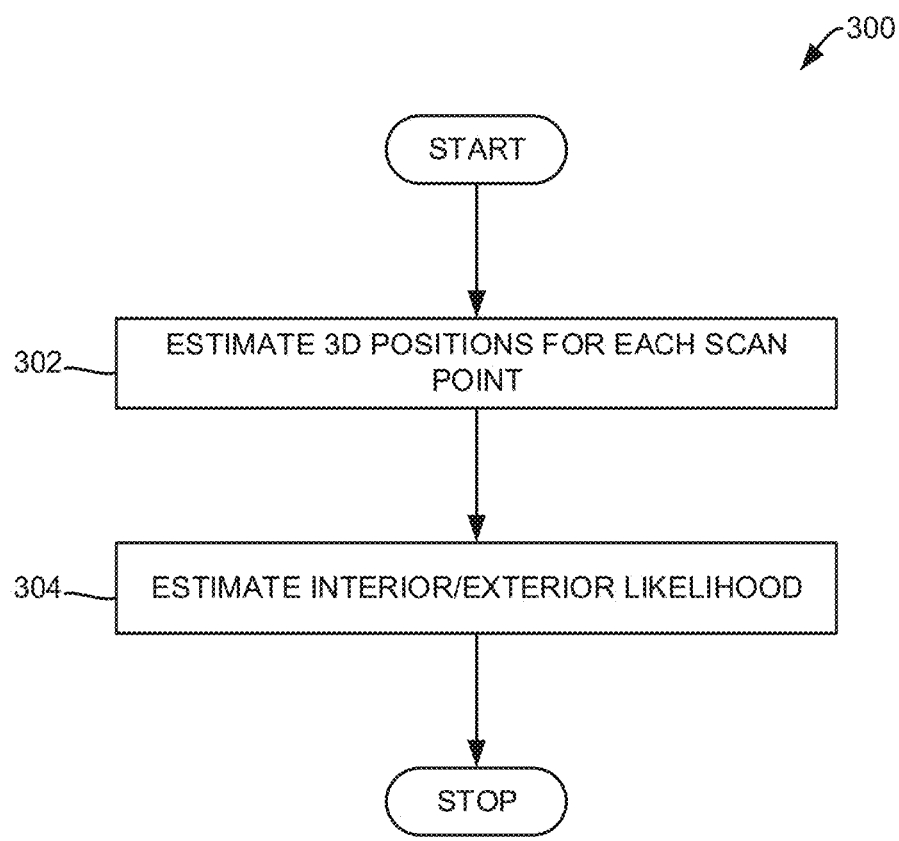
FIG. 3 is an illustrative flowchart of methods for indoor 3D surface reconstruction and 2D floor plan recovery by segmentation of building and objects in accordance with embodiments of the present invention.

FIG. 3 is an illustrative flowchart 300 of methods for indoor 3D surface reconstruction and 2D floor plan recovery by segmentation of building and objects in accordance with embodiments of the present invention. In particular, flowchart 300 is further representative of a step 204 FIG. 2. At a first step 302, the method estimates a 3D position and a corresponding uncertainty of the 3D position from a system trajectory for each scan point in the scan data from the building. As noted above, system trajectory may be represented as a sequence of positions and orientations over time. In embodiments, the estimated 3D position for each scan point may be represented as two 3D Gaussian distributions. As such, for each input scan, the scanning device sensor position may be represented by Gaussian $N(\mu_s, C_s)$ and the scan point position may be represented by $N(\mu_s, C_p)$. For tractability, an assumption that the scan frame's distribution is independent from the position of other scan frames may be maintained.

At a next step 304, the method estimates the likelihood that the surrounding volume of a scan point is interior or exterior. The uncertainty in the position values of each scan point may originate from at least three independent sources of error: a localization estimate, a timestamp synchronization, and intrinsic sensor noise. Localization noise may arise from errors in the estimate of the system trajectory and is generally the largest source of error with typical standard deviations on the order of 20 cm. Timestamp synchronization errors may be due to combining measurements from several sensors whose timestamps need to be transformed to a common clock. Unsynchronized timestamps may contribute spatial errors of scan points especially when the scanning system is moving or rotating rapidly while scanning distant objects. In these cases, an estimate of the scan point's position changes depending on an estimate of when a scan is taken. However, since sensors may be synchronized to an accuracy of approximately 1 ms, synchronization error may be the lowest source of noise in the scan points, contributing uncertainty to scan point positions of under 1 cm. Intrinsic sensor noise depends on the sensor hardware, whose intrinsic noise characterization may be provided by a manufacturer of the hardware. Typically, intrinsic sensor noise contributes on the order of 1 to 2 cm to the standard deviation of the positional estimate of scan points. This uncertainty value increases as the range of the point increases with accurate measurements stopping at a range of 30 m.

The covariance matrices associated with each of these three sources of noise may be added to determine the net uncertainty for the positions of each scan point pair. The uncertainties for the positions of each scan point may be represented with covariance $C_s$ and $C_p$ respectively. The estimate for each scan point may then be utilized to form a "carve mapping" which describes the likelihood of any location of being interior or exterior based on the position estimates from a scan point. The method then ends.

Figure 4:
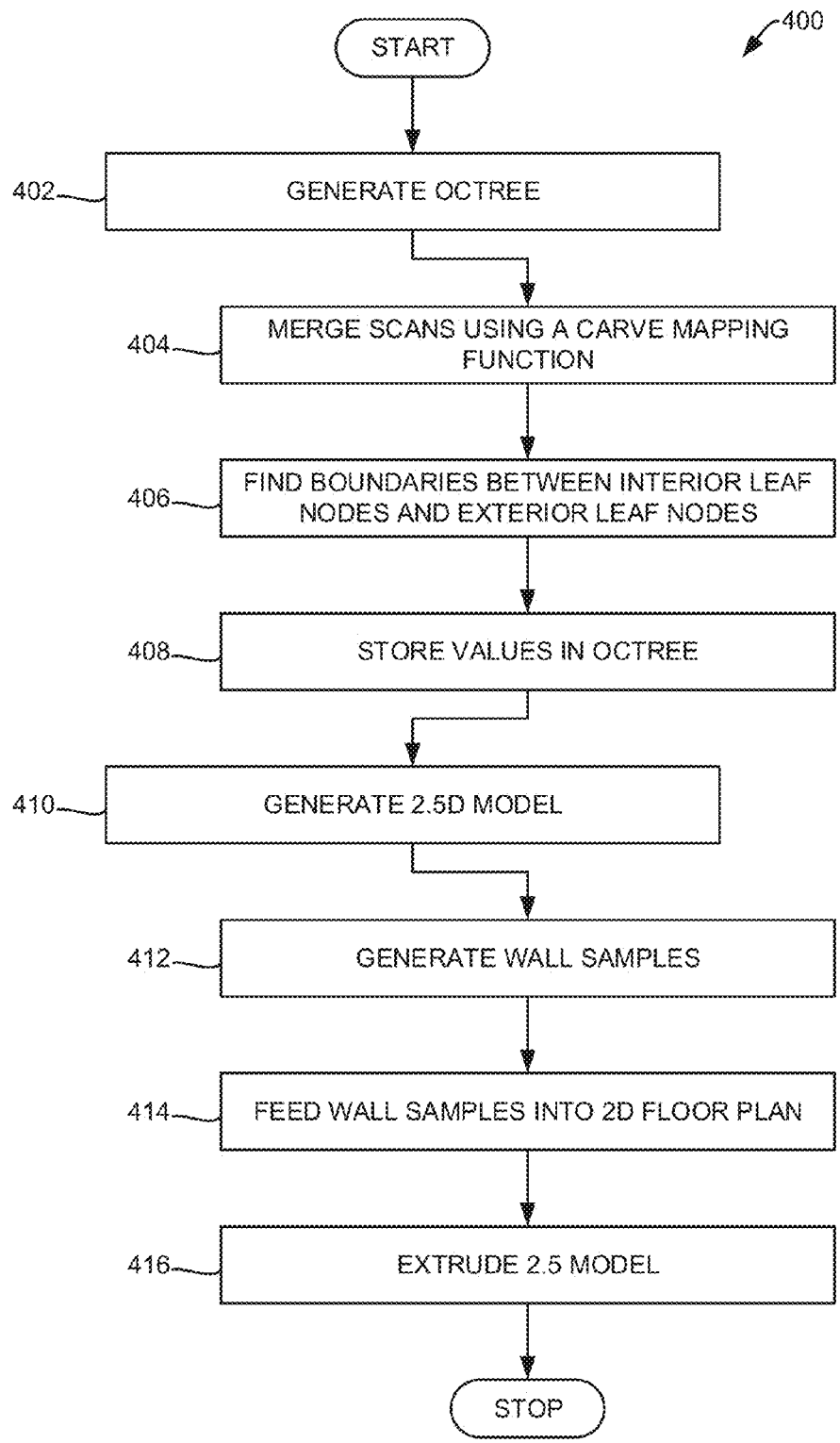
FIG. 4 is an illustrative flowchart of methods for indoor 3D surface reconstruction and 2D floor plan recovery by segmentation of building and objects in accordance with embodiments of the present invention.

FIG. 4 is an illustrative flowchart 400 of methods for indoor 3D surface reconstruction and 2D floor plan recovery by segmentation of building and objects in accordance with embodiments of the present invention. In particular, flowchart 400 is further representative of a step 206 FIG. 2. Flowchart 400 presents methods for generating two models: an octree and a 2.5D model as represented by steps 402 and 410 respectively. As such, at a step 402, the method generates an octree. In general, an octree is a tree data structure in which each internal node has exactly eight children. Octrees are most often used to partition a three dimensional space by recursively subdividing it into eight octants. An advantage of an octree is that every point in space can be represented, but certain areas can have finer detail than others. For example, objects may have a finer detail than building walls in embodiments. At a next step 404, the method merges all scan points spatially using a carve mapping function to obtain a fused probabilistic estimate for any point. The fused probabilistic estimate is computed as the maximum-likelihood estimate based on all nearby scans, where any scan whose mean scan-line position is more than 3 standard deviations away from the scan point being examined does not contribute to the fused probabilistic estimate.

At a next step 406, the method determines interior leaf nodes, exterior leaf nodes, and boundary faces between the interior leaf nodes and exterior leaf nodes. The leaf nodes of the octree contain a compiled probabilistic model of the degree to which that node is labeled as interior or exterior. Each leaf node contains at least: the fused probabilistic estimate for all scan points, variance of the samples of estimates from each intersecting scan ray, and the of number of scans that intersect the leaf node. All these statistics may be utilized later in the pipeline for analyzing the properties of the leaf node. As an example, if fused probabilistic estimate is 0.5 or less, then the node is considered exterior. Nodes that are never intersected by scans are assumed to be exterior and are assigned a fused probabilistic estimate of 0.5. If the fused probabilistic estimate is strictly greater than 0.5, then the node is considered interior. The faces between interior nodes and exterior nodes are considered boundary faces of the octree, and are useful for determining the position of generated meshes. At a next step 408, the method stores leaf external leaf nodes, the internal leaf nodes, and the boundary faces in the octree. In some embodiments, the method the octree is generated at a resolution in a range of approximately 5 to 10 cm.

At a next step 410, the method generates a 2.5D model. In embodiments, a technique known in the art may be utilized that produces a 2D floor plan of the environment and extrudes a 2.5D model using the height information of each room. As such, at a next step 412, generates wall samples from the octree, which are a set of points in 2D space that are locations with high likelihood of being wall positions. This set of points may be utilized by the 2D floor plan generation procedure as input data. Generating wall samples may proceed first by clustering the boundary faces of the octree into planar regions that represent all surfaces in the model as flat, planar structures. These planar regions may be formed bottom-up by iteratively consolidating boundary node faces into regions via Principal Component Analysis (PCA) of boundary face positions utilizing methods known in the art. This step produces a single planar region for each dominant surface of the model. In addition, generating these wall samples using the octree as input ensures that the final floor plan is well-aligned with the octree geometry. The results may then be filtered to keep only surfaces within 5 degrees of vertical and at least 1 m tall. To counteract any occlusions, the represented geometry of each wall may be expanded to include any exterior points that are within the 2D convex hull of each wall planar region. Once 3D wall positions are obtained, the generated points may be utilized to estimate 2D positions of vertical surfaces. At a next step 414, the method feeds the wall samples into a 2D floor plan of the building structure elements to create a watertight 2D model. In general, a floor plan may be generated by partitioning space into interior and exterior domains. The interior represents all open space in the environment, such as rooms and hallways, while the exterior represents all space outside of the building, space occupied by solid objects, or space that is unobservable. Once partitioning is completed, boundary lines between the interior and exterior may be utilized to represent the exported walls of the floor plan.

Input samples may be utilized to define a volumetric representation by generating a Delaunay Triangulation on the plane. Each triangle is labeled either interior or exterior by analyzing the line-of-sight information of each wall sample. Initially, all triangles are considered exterior. Each input wall sample, may be viewed by a set of scanner positions. For every scanner position, a line segment denotes the line-of-sight occurring from the scanner to the scanned point during data collection. No solid object can possibly intersect this line, since otherwise the scan would have been occluded. Thus, all triangles intersected by the line segment may be relabeled to be interior.

In order to prevent fine details from being removed, occlusions may be checked for when carving each line segment (s, p). If another wall sample (p') is located in between the positions of s and p, then the line segment is truncated to (s, p'). Thus, no features captured by wall samples are ever fully carved away, preserving environment details. This process carves away the interior triangles with each captured scan. Since these scans may be captured on a mobile scanner, the scanner poses are ordered in time. In order for the system to traverse the environment, the line segment between adjacent scanner poses must also intersect only interior space. In addition to carving via scanner-to-scan lines, the same carving process may be performed with scanner-to-scanner line segments. Because height information is stored in the 2D floor plan, the method may then extrude a 2.5D model from the 2D model at a step 416, whereupon the method ends. Extruding a 2.5D model may proceed using any method known in the art in embodiments.

Figure 5:
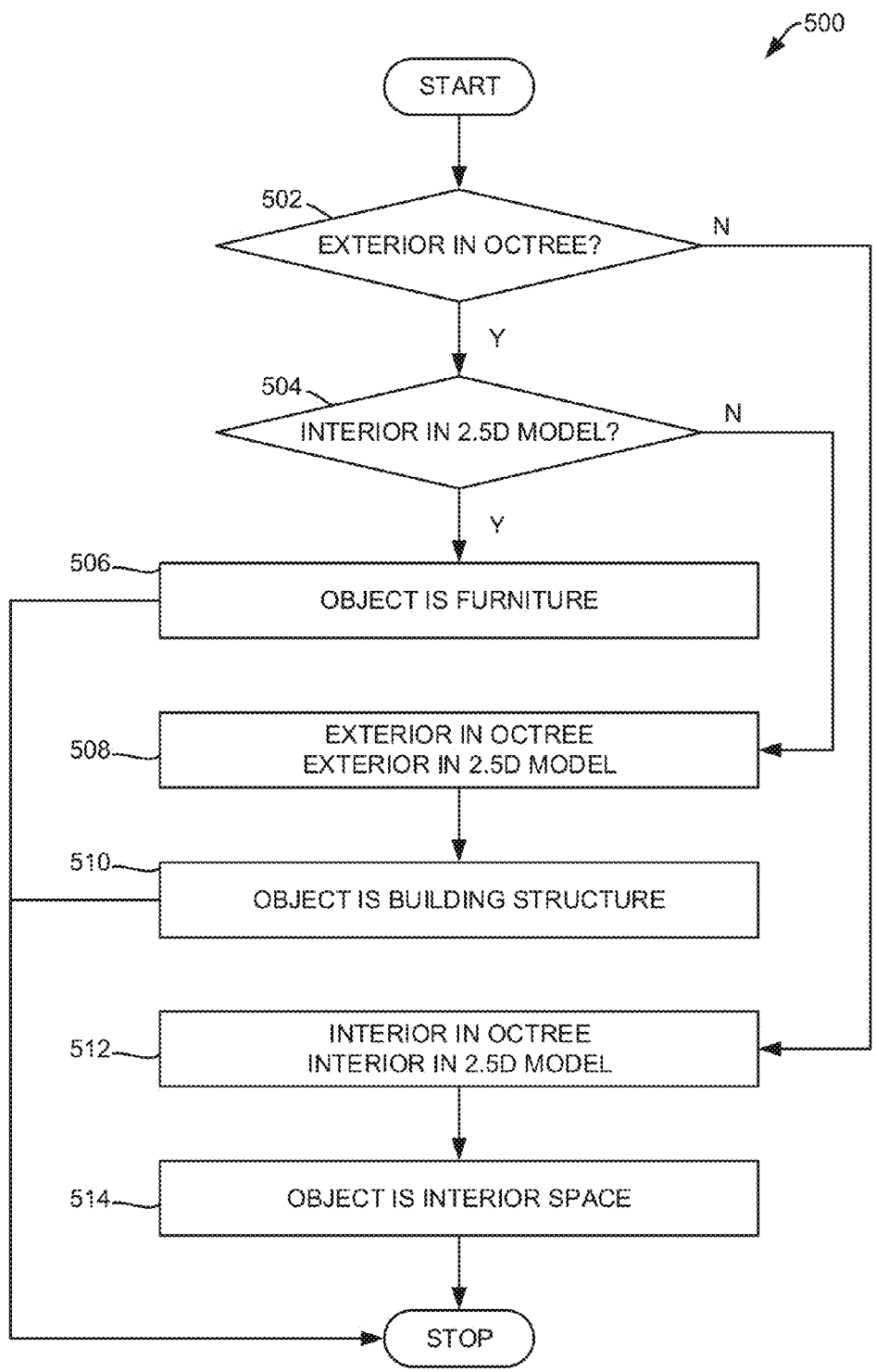
FIG. 5 is an illustrative flowchart of methods for indoor 3D surface reconstruction and 2D floor plan recovery by segmentation of building and objects in accordance with embodiments of the present invention.

FIG. 5 is an illustrative flowchart 500 of methods for indoor 3D surface reconstruction and 2D floor plan recovery by segmentation of building and objects in accordance with embodiments of the present invention. In particular, flowchart 400 is further representative of a step 208 FIG. 2. Methods illustrated extract interior and exterior volumes for all scan points from the generated models. As such, at a first step 502, the method determines whether a scan point is labeled exterior in the octree. If the method determines at a step 502 that the scan point is not labeled exterior in the octree, then the method proceeds to a step 512, indicating that the scan point is interior both in the octree as well as the 2.5D model. As such, the method continues to a step 514 to indicate that the scan point is an interior space object. If the method determines at a step 502 that the scan point is labeled exterior in the octree, then the method proceeds to a step 504 to determine whether the scan point is labeled interior in the 2.5D model. If the method determines at a step 504 that the scan point is labeled interior in the 2.5D model, then the method proceeds to a step 506 to determine that the scan point is an object (furniture). If the method determines at a step 504 that the scan point is not labeled interior in the 2.5D model, then the method proceeds to a step 508 indicating that the scan point is exterior both in the octree as well as the 2.5D model. As such, the method continues to a step 510 to indicate that the scan point is a building structure element.

The following table is provided for clarity:

Octree(Exterior)/2.5D Model(Exterior): scan point is building structure element

Octree(Exterior)/2.5D Model(Interior): scan point is an object

Octree(Interior)/2.5D Model(Interior): scan point is interior open space

When a scan point is classified as an object, it may be useful in some embodiments to generate a higher resolution leaf node corresponding with the scan point for storing in the octree. In some embodiments, the higher resolution is approximately 1 cm.

Figure 6:
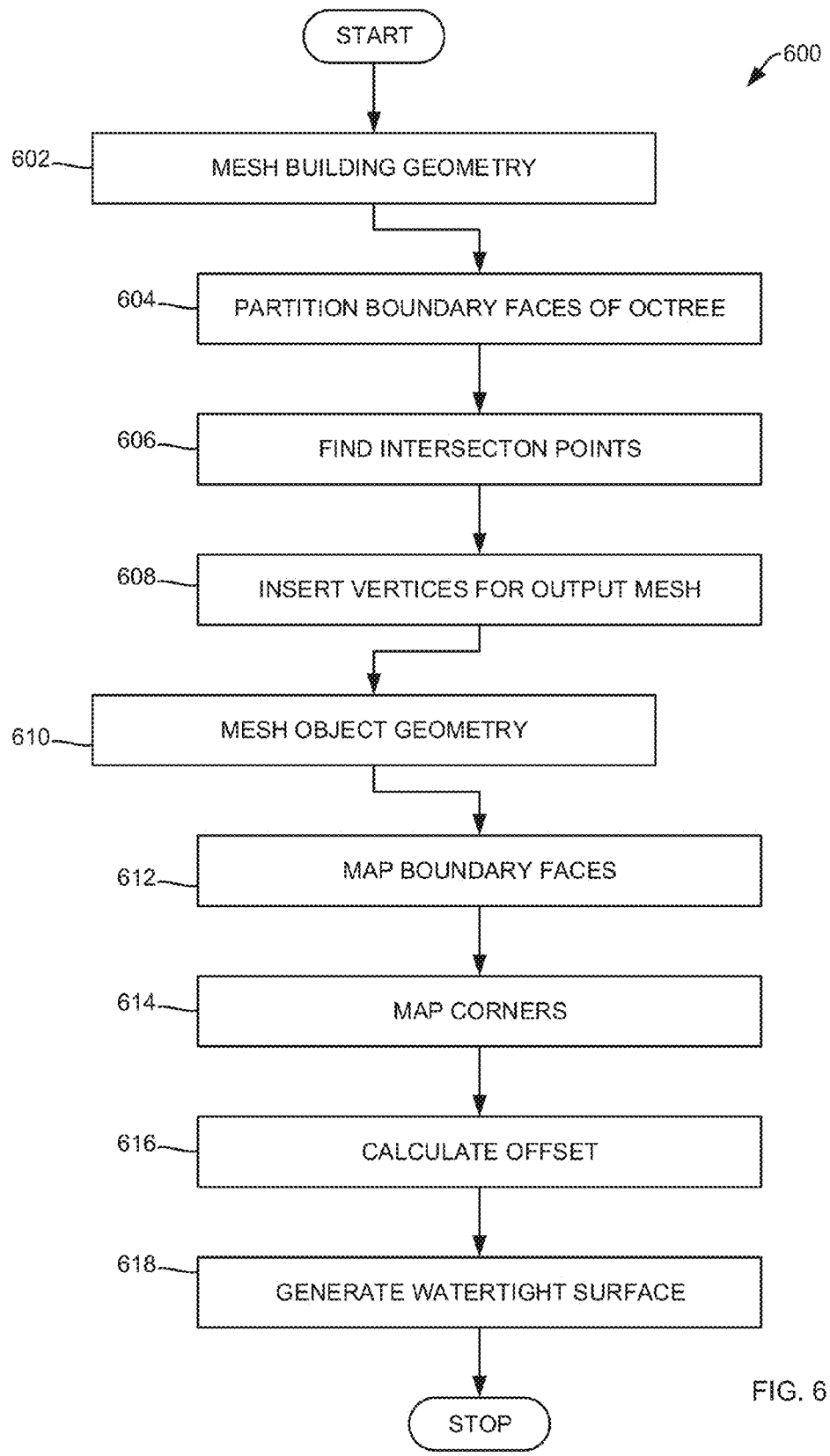
FIG. 6 is an illustrative flowchart of methods for indoor 3D surface reconstruction and 2D floor plan recovery by segmentation of building and objects in accordance with embodiments of the present invention.

FIG. 6 is an illustrative flowchart 600 of methods for automated segmentation of building and objects in accordance with embodiments of the present invention. In particular, flowchart 400 is further representative of a step 210 FIG. 2. In general, after methods segment the octree geometry into objects and rooms, the method can mesh the 3D object geometry and room geometry separately. 3D object geometry such as furniture and light fixtures tend to have higher detail than the room geometry. Room geometry tends to be composed of large, planar surfaces requiring less detail. Methods may utilize a dense meshing technique to represent the 3D object geometry, which preserves detail and curves in the geometry. For the room geometry, methods may identify planar regions and mesh each plane efficiently with large triangles. Flowchart 600 presents methods for meshing 3D building geometry at a step 602 and meshing 3D object geometry at a step 610. As such, at a step 602, the method meshes 3D building geometry. At a next step 604, the method partitions each of the boundary faces in the octree into a planar region. Each planar region represents a set of boundary faces along with fitting plane geometry. At a next step 606, the method finds intersection points between each pair of neighboring planar regions and insert vertices for the 3D building geometry at a step 608 to generate a watertight 3D building geometry.

Planar region fitting on leaf octnode data may be performed to intersect the fitting planes of each region to determine the locations of output mesh vertices shared by multiple regions. This process may produce artifacts or self intersections at locations where two nearly-parallel regions are neighbors. Instead, methods may utilize a pseudo-intersection point that is closer to the original corner position. If the intersection point of all planes is taken, the vertex position may be under-constrained if some of the regions are close to being parallel. Embodiments perform singular value decomposition of the space of plane normal vectors to determine if this basis is under-constrained. Any under-represented dimensions in a vertex's position are set to the original node corner position. This process produces connecting vertices between planar regions that reside as close to the geometric intersection of the fitted planes as possible, without producing degenerate artifacts in the final mesh. Once the locations of vertices shared by two or more planar regions are computed, then the interior area of each region is triangulated using a 2D variant of isosurface stuffing. This method to represent building elements is important for features that do not follow the 2.5D assumption, such as windows or doorframes.

At a next step 610, the method meshes 3D object geometry. When meshing 3D object geometry, a variant of Dual Contouring may be utilized since it works well with adaptively-sized nodes in an octree and represents both curved and sharp features in the output geometry. Since data labels are divided into node centers of the tree, rather than node corners, the method performs dual contouring by mapping each boundary face of the octree at a step 612 to a vertex in the 3D object geometry and maps each corner of the octree at a step 614 into a face in the 3D object geometry. At a next step 616, the method calculates an offset. The vertex position of the mesh is offset from each node face based on the stored probability value of that node. This offset positions the 3D object geometry at the probability value of 0.5 isosurface, which provides sub-node accuracy for the generated surface position. The method continues to a step 61 to generate a watertight 3D object geometry. An important aspect of meshing these two segments separately is to ensure watertightness of building and object models. The surfaces of walls hidden behind any occluding objects are still meshed, even though they are never directly scanned. Similarly, the hidden surfaces of objects are also fully meshed.

Figure 7:
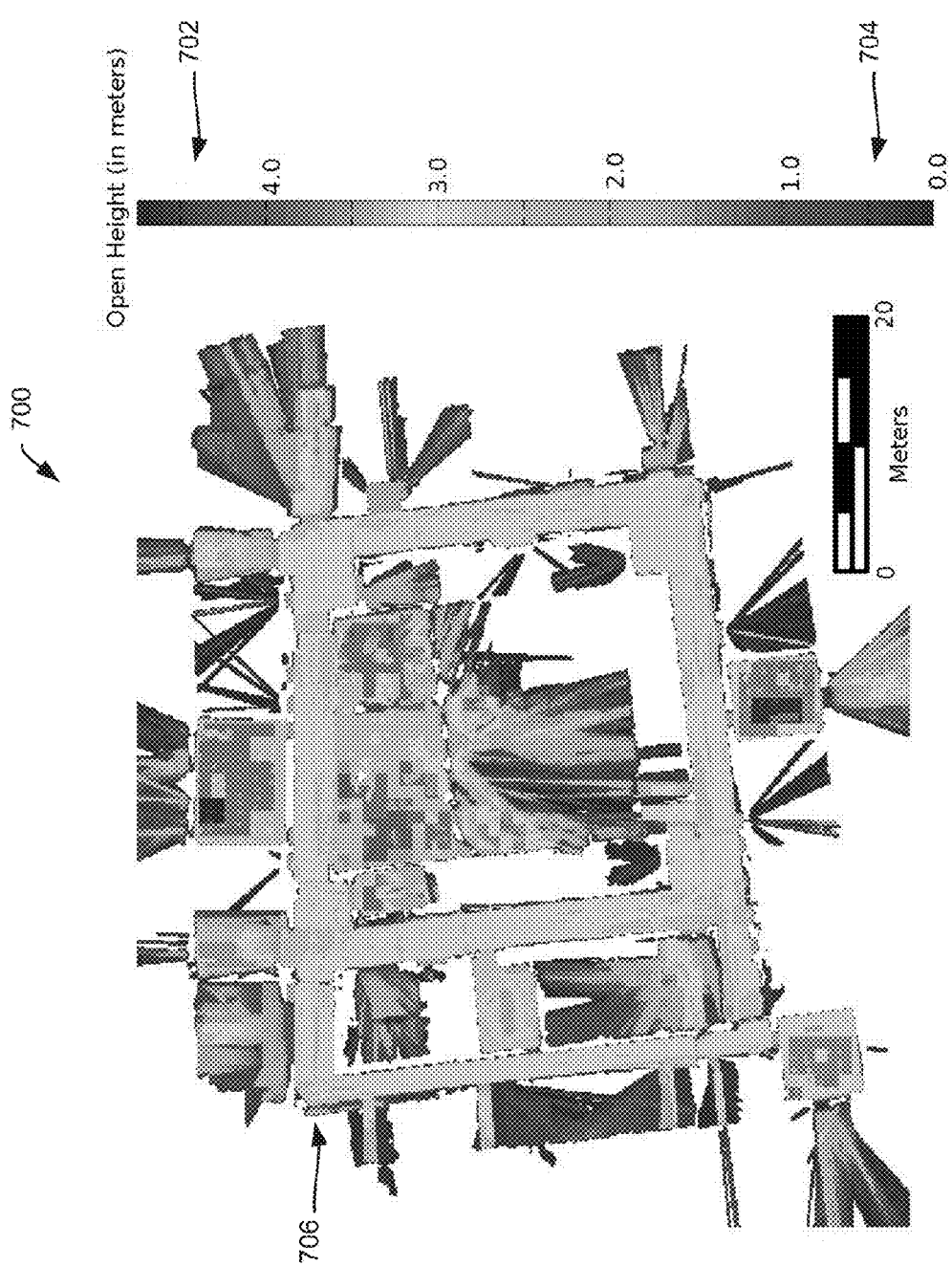
FIG. 7 is an illustrative representation of top-down 2D histogram of a generated model in accordance with embodiments of the present invention.

FIG. 7 is an illustrative representation of top-down 2D histogram 700 of a generated model in accordance with embodiments of the present invention. The octree data structure disclosed above represents full 3D volumetric information about a scanned environment. These values can span across several scanned floors of an environment (or building) and may be utilized to generate a fully-detailed 3D model. In an embodiments, this data may be compiled to present a 2D visualization of the modeling environment. As illustrated, a top-down, 2D histogram 700 may be generated representative of the values corresponding with internal leaf nodes stored in the octree. In each node, a value for the probability of interior may be stored. By generating a sum for each xy-position of these values, which intersects all nodes along a vertical column, the expected "open height" may be determined. This value indicates how much of the model is labeled interior at each xy-position, yielding a map of the 2D representation of each level. FIG. 7 is an example of this top-down 2D histogram embodiment. This figure corresponds with a model generated by methods disclosed herein. This histogram illustrated is colored by the amount of open height at each location so that red 702 indicates a large open space and blue 704 indicates a very shallow volume. Since models generated show a representation of all volume that was scanned within an octree, the output includes partial scans of the exterior area of the building, which may be observed through windows and doors to the outside. These artifacts can be removed by performing an intersection test with the generated floor plan of the environment. Note that the illustrated histogram may pick up the detail of the light fixtures 706 on the ceiling as well, which show up as three bars across the length of the room. This visualization shows how analysis of the octree structure may result in more accurate wall positions than wall samples taken from the point cloud scans directly.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for indoor 3D surface reconstruction and 2D floor plan recovery by segmenting a plurality of objects and building structure elements from a building scan using an electronic computing device, the method comprising:
   causing the electronic computing device to capture the building scan, wherein the building scan includes a plurality of scan points;
   pre-processing scan data from the building scan, wherein the pre-processing includes at least, estimating for each scan point of the plurality of scan points, a likelihood that a nearby volume to the each scan point of the plurality of scan points is an interior location or an exterior location;
   generating an octree and a 2.5D model from the pre-processed scan data;
   extracting interior and exterior volumes from the octree model and the 2.5D model, wherein the extracting interior and exterior volumes comprises:
   for the each scan point of the plurality of scan points, if the scan point is exterior in the octree and interior in the 2.5D model, classifying the scan point as one of the plurality of objects;
   if the scan point is exterior in the octree and exterior in the 2.5D model, classifying the scan point as one of the building structure element; and
   if the scan point is interior in the octree and interior in the 2.5D model, classifying the scan point as an interior open space; and
   meshing the extracted volumes to generate a 3D object geometry and a 3D building geometry, wherein the 3D object geometry corresponds with the plurality of objects and the 3D building geometry corresponds with the indoor 3D surface reconstruction of the building structure elements.

2. The method of claim 1, wherein the pre-processing the scan data further comprises:

estimating a 3D position and a corresponding uncertainty of the 3D position from a system trajectory for the each scan point of the plurality of scan points in the scan data.

3. The method of claim 2, wherein the estimated 3D position for the each scan point of the plurality of scan points is represented as two 3D Gaussian distributions.

4. The method of claim 2, wherein the estimating the 3D position for the each scan point of the plurality of scan points further comprises accounting for an uncertainty selected from the group consisting of: a localization estimate, a timestamp synchronization, and an intrinsic sensor noise.

5. The method of claim 1, wherein the octree is generated at a resolution in a range of approximately 5 to 10 cm.

6. The method of claim 1, wherein the generating the 2.5D model further comprises:
    generating a plurality of wall samples from the octree;
    feeding the plurality of wall samples into a 2D floor plan of the building structure elements to create a watertight 2D model; and
    extruding the 2.5D model from the 2D model.

7. The method of claim 1, wherein if the scan point is classified as the one of the plurality of objects, generating a higher resolution leaf node corresponding with the scan point.

8. The method of claim 7, wherein the higher resolution is approximately 1 cm.

9. The method of claim 1, wherein the meshing the extracted volumes to generate the 3D building geometry further comprises:
    partitioning each of a plurality of boundary faces in the octree into a planar region;
    determining any intersection points between neighboring planar regions; and
    inserting vertices for the 3D building geometry.

10. The method of claim 1, wherein the meshing the extracted volumes to generate the 3D object geometry further comprises:
    mapping each of a plurality of boundary faces to a vertex in the 3D object geometry;
    mapping each corner of the octree into a face of the 3D object geometry;
    calculating an offset to position the 3D object geometry; and
    generating a watertight surface for the 3D object geometry.

11. The method of claim 1, further comprising:
    generating a top-down 2D histogram of values corresponding with a plurality of internal leaf nodes in the octree.

12. A computing device program product for indoor 3D surface reconstruction and 2D floor plan recovery by segmenting a plurality of objects and building structure elements from a building scan using an electronic computing device, the computing device program product comprising a non-transitory computer readable medium having stored thereon a set of programmatic instructions, which when executed by the electronic computing device, causes the electronic computing device to:
    capture the building scan, wherein the building scan includes a plurality of scan points;
    pre-process scan data from the building scan, wherein the pre-process includes at least, estimating for each scan point of the plurality of scan points, a likelihood that a nearby volume to the each scan point of the plurality of scan points is an interior location or an exterior location;
    generate an octree and a 2.5D model from the pre-processed scan data;
    extract interior and exterior volumes from the octree model and the 2.5D model, wherein the extraction of interior and exterior volumes comprises:
        for the each scan point of the plurality of scan points,
        if the scan point is exterior in the octree and interior in the 2.5D model,
            classifying the scan point as one of the plurality of objects;
        if the scan point is exterior in the octree and exterior in the 2.5D model,
            classifying the scan point as one of the building structure element; and
        if the scan point is interior in the octree and interior in the 2.5D model,
            classifying the scan point as an interior open space; and
    mesh the extracted volumes to generate a 3D object geometry and a 3D building geometry, wherein the 3D object geometry corresponds with the plurality of objects and the 3D building geometry corresponds with the indoor 3D surface reconstruction of the building structure elements.

13. The computing device program product of claim 12, wherein the pre-process of the scan data further comprises:
    estimate a 3D position and a corresponding uncertainty of the 3D position from a system trajectory for the each scan point of the plurality of scan points in the scan data.

14. The computing device program product of claim 12, the generation of the 2.5D model further comprises:
    generate a plurality of wall samples from the octree;
    feed the plurality of wall samples into a 2D floor plan of the building structure elements to create a watertight 2D model; and
    extrude the 2.5D model from the 2D model.

15. The computing device program product of claim 12, wherein the meshing of the extracted volumes to generate the 3D building geometry further comprises:
    partition each of a plurality of boundary faces in the octree into a planar region;
    determine any intersection points between neighboring planar regions; and
    insert vertices for the 3D building geometry.

16. The computing device program product of claim 12, wherein the meshing of the extracted volumes to generate the 3D object geometry further comprises:
    map each of a plurality of boundary faces to a vertex in the 3D object geometry;
    map each corner of the octree into a face of the 3D object geometry;
    calculate an offset to position the 3D object geometry; and
    generate a watertight surface for the 3D object geometry.

* * * * *